United States Patent Office 3,294,711
Patented Dec. 27, 1966

3,294,711
GRAFT POLYMERS OF VINYL ACETATE OR VINYL CHLORIDE ONTO A SATURATED POLYESTER BACKBONE, AND POLYURETHANE FOAMS THEREFROM
Wulf von Bonin, Leverkusen, Germany, assignor to Farbenfabriken Bayer Aktiengesellschaft, Leverkusen, Germany, a German corporation
No Drawing. Filed Apr. 22, 1963, Ser. No. 276,118
(Filed under Rule 47(b) and 35 U.S.C. 118)
8 Claims. (Cl. 260—2.5)

This invention relates to a process for the production of graft polymers from polymerizable vinyl compounds and saturated polyesters.

It is known to produce graft polymers of polyalkylene oxide by polymerizing polyalkylene glycols with vinyl compounds or with ethylenic or nitrogeneous monomers, such as acrylonitrile and acrylamide. It has also already been proposed to graft acrylonitrile onto polyvinyl alcohol, cellulose methyl ether and polyvinyl pyrrolidone. In this way, there are formed so-called graft polymers which are highly polymeric substances and the molecules of which consist of two or more polymer components of different composition, which are covalently linked to each other. Such graft polymers have physical properties which differ from those of normal copolymers. Thus, modified polymers can be produced by a relatively simple polymerization process. These heretofore known graft polymers have unsatisfactory crystallinity, water solubility and chemical resistance.

It is therefore an object of this invention to provide graft polymers which are substantially devoid of these disadvantages. Another object of this invention is to provide polyurethane plastics based on said graft polymers which have improved physical properties. Another object of this invention is to provide a process for the preparation of graft polymers which have improved physical properties. Still, another object of this invention is to provide graft polymers containing active hydrogen containing groups as determined by the Zerewitinoff method which are suitable for the preparation of polyurethane plastics. Still, a further object of this invention is to provide polyurethane plastics including cellular and non-cellular polyurethane plastics.

The foregoing objects and others which will become apparent from the following description are accomplished in accordance with the invention, generally speaking, by providing graft polymers wherein polymerizable, monomeric ethylenically unsaturated compounds, such as olefines, vinyl esters, vinyl halides, styrenes and vinyl compounds containing nitrogen groups are subjected to free-radical polymerization with saturated polyesters of the general formula:

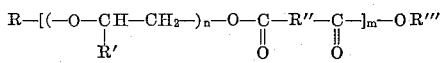

wherein R represents a hydrogen atom, a linear or branched-chain, saturated polyester radical, a monocarboxylic acid radical or a dicarboxylic acid radical; R' represents a hydrogen atom or a lower alkyl radical; R" represents an aliphatic hydrocarbon chain containing from 4 to 12 carbon atoms, a cycloaliphatic radical or an aromatic radical; R''' represents a hydrogen atom on an alkoxy radical; $n$ is 1, 2, or 3 and $m$ is at least 2 and the molecular weight of the polyester is at least about 900. In this case, a grafting reaction proceeding with high degrees of grafting takes place between the initially supplied polyester and the polymerizable vinyl monomers. It was not to be expected from the known state of the art that the saturated polyesters employed, of which the molecule chain compared with polyalkylene oxides of equal molecular weight, is built up only to a subordinate degree of polyalkylene oxide units, constitute an exceptionally suitable grafting base.

Therefore R in the above formula may be obtained by removing a hydrogen atom from a polyester prepared by a process which comprises reacting a polyhydric alcohol with a polycarboxylic acid (such as polyethylene adipate having a molecular weight of 500); it may be a radical, obtained by removing a hydrogen atom from the carboxylic acid group of a monomeric carboxylic acid, such as acetic acid, benzoic acid or the like; or it may be a radical obtained by removing a hydrogen atom from one of the carboxylic acid groups of a dicarboxylic acid such as adipic acid, 1,4-benzene dicarboxylic acid or the like. The radical R' may represent a hydrogen atom or, if it is a lower alkyl radical, it may be methyl, ethyl, propyl, butyl, hexyl, or the like, preferably containing 1 to 5 carbon atoms. R" in the foregoing formula may be any suitable aliphatic hydrocarbon radical containing from 4 to 12 carbon atoms such as 1,4-butylene, 1,3-butylene, 1,4-amylene, 1,6-hexylene, 1,12-dodecylene, or it may be any suitable cycloaliphatic radical such as 1,4-cyclohexylene, or it may be any suitable aromatic radical such as paraphenylene, 1,5-naphthalene, p,p'-biphenylene, p,p'-bis(phenylene)methane, and the like. R''' may be a hydrogen atom or an alkoxy radical such as for example methoxy, ethoxy, propoxy, butoxy or the like.

This was even less to be expected, as the polyesters need no longer show any polyalkylene oxide character, as expressed perhaps in the case of polyethylene oxide in terms of crystallinity, water-solubility and extensive chemical resistance. Furthermore, it was not to be anticipated that the polyesters employed in the process according to the present invention permit unusually good grafting yields, although they contain only segments built up from dimeric or trimeric polyalkylene oxide units, whereas it is verified in British patent specification No. 874,130 that the grafting reaction on the basis of polyalkylene oxides only produce useful yields with the tetramers. As shown by a comparison, diethylene glycol is relatively unsuitable as a grafting base, because even with the polymerization of a vinyl monomer (e.g. vinyl acetate) in diethylene glycol as solvent, predominant quantities of homopolymer are always still formed, whereas grafting yields higher than 85% can be produced by employing adipic acid-diethylene glycol polyesters having a molecular weight of about 1800 as grafting base. Even more characteristic is the discovery that polymers which can be cross-linked with polyisocyanates are not obtained by the polymerization of, for example, vinyl acetate in diethylene glycol, whereas the polymerization of vinyl acetate in an adipic acid-diethylene glycol polyester having a molecular weight of about 2000 and an OH number of about 42 produces a polymer which can be cross-linked by polyisocyanates to give solvent-resistant films.

The polyesters employed in the process according to the present invention as grafting base may be either branched or linear polyesters and should preferably be homogeneously miscible with the vinyl monomers. The molecular weight of the polyester should be at least about 900 and preferably in the range from about 900 to about 9000. The polyester can be built up from polybasic organic acids, preferably containing more than 3 carbon atoms, as acid component. It is possible to use any of the aliphatic dicarboxylic acids and which are generally employed in the product of polyesters, for example succinic acid, adipic acid, azelaic acid and pimelic acid. The acids may be employed either separately or in admixture. Cycloaliphatic polycarboxylic acids (e.g. cyclohexane-dicarboxylic acid) and aromatic polycarboxylic acids (e.g. isophthalic acid, terephthalic acid and carboxy phenyl acetic acid) can also be employed. It is obvious that mixtures of different polycarboxylic acids are suitable as acid component for the formation of the polyester, which may be branched with the aid of aliphatic or aromatic more highly basic carboxylic acids, such as tartaric acid, citric acid, cyclohexane-tricarboxylic acid, trimellitic acid and napthalene-tetracarboxylic acids.

Glycols may be employed as the alcohol component of the polyester grafting base. The glycols may be used exclusively or in admixture with other polyfunctional alcohols, such as the glycols obtained up to degrees of polymerization of three or more by hydrolysis or by (mixed) oligomerization of alkylene oxides. It is preferred to use ethylene glycol, diethylene glycol and triethylene glycol, but other glycols, such as saponified propylene oxide or propylene oxide dimerized or trimerized in the presence of $H_2O$, or addition products of one or two mols of propylene oxide with glycol, and also corresponding low oligomerization products of other alkylene oxides, such as styrene oxide or butadiene oxide, are suitable as alcoholic component for the production of the polyester employed as grafting base in the process according to the present invention. These alcoholic components are employed in such an amount that the polyester molecule which is formed contains at least two segments which can be attributed to the incorporation of an alkylene oxide having a degree of polymerization of about 1 to about 3 as alcoholic component. The alcoholic components are preferably employed in such an amount that the polyester molecule which is formed consists exclusively of such segments. Other diols which may be employed in admixture with the aforementioned oligomerization products for the production of the polyesters are propylene glycol, butanediol, pentanediol, hexanediol, cyclohexanediol and mixtures thereof. These alcohols, however, should not be employed in an amount of more than 95 mol percent of the alcoholic component of the polyester. The actual production of the polyester is effected by known methods. In accordance with the present process the polymerization of unsaturated vinyl compounds is effected in the presence of the polyesters described in the preceding paragraphs.

Suitable vinyl compounds are aliphatic and aromatic vinyl compounds which can be subjected to free-radical polymerization, such as vinyl esters (e.g. vinyl acetate, vinyl chloracetate, vinyl stearate and vinyl benzoate), acrylic and methacrylic acid derivatives (e.g. methyl methacrylate, methyl acrylate, ethyl acrylate and butyl acrylate) and acrylic and methacrylic acids. Other suitable vinyl compounds are those which contain halogen (e.g. vinyl and vinylidene chloride and acryl chloride); nitrogen-containing vinyl compounds (e.g. acrylonitrile and acrylamide) and olefinic hydrocarbons (e.g. ethylene, isoprene and butadiene). Styrene, vinyl naphthalene, vinyl toluene and vinyl carbazole are suitable aromatic vinyl compounds. However, it should be emphasized that vinyl esters (e.g. vinyl acetate) and vinyl halides (e.g. vinyl chloride) are especially suitable for the process described. In addition, it is possible to employ polymerizable polyvinyl compounds (for example glycol dimethacrylate, triallyl cyanurate, triallyl phosphate and divinyl benzene). The polymerization of the vinyl compounds is carried out in the presence of the aforementioned polyester components. The vinyl compound is preferably employed in an amount of from about 1 percent to about 99 percent by weight, based on the weight of the reaction mixture. The polymerization is preferably carried out with the aid of free-radical forming initiators.

The polymerization can be carried out in bulk in which case the polyester component, preferably alone or in combination with an inert solvent, i.e. a solvent not impeding the polymerization is combined with the vinyl compound to be polymerized. Suitable solvents are inter alia, aromatic compounds (e.g. benzene) and aliphatic compounds (e.g. ethyl acetate methanol and tertiary-butanol). The polymerization is preferably effected by free-radical forming catalysts which are soluble in the mixture to be polymerized. Examples of such catalysts are organic peroxides, peroxydicarbonates and azo compounds, benzoyl peroxide, tertiary-butyl-hydroperoxide, aliphatic azobisnitriles, such as azodiisobutyronitrile, peroxybenzene dicarbonate and the like. The process according to the present invention can, however, also be carried out in aqueous emulsion in which case the vinyl monomer is emulsified in water together with the polyester employed as grafting base and then polymerized in the manner usual with emulsion polymerization processes. In this case, it is preferred to use water-soluble activator systems (e.g. alkali metal persulphates), if desired in combination with reducing agents, such as alkali metal pyrosulphites. The products obtained by the process according to the present invention are polymers intimately plasticised with the polyesters or polyesters which have been modified in its properties as regards for example viscosity, inflammability, strength, crystallinity and surface-active behaviour by means of the polymer fraction. Generally speaking, the properties of the products obtained by the process according to the present invention and of polyester character can be continuously changed to polymer character. In addition, with the aid of the present invention, reactive terminal or side groups of the polyester, such as hydroxyl or carboxyl groups, can be introduced into a polymer, which can be of value for further reactions with the products of the process.

The technical advance of the process according to the present invention is based not only on the fact that it is possible with the aid thereof to produce products in the simplest technical manner, which products combine the properties of the polyester, such as resistance to benzene and ozone, these properties being considerably better for example by comparison with polyethers, with those of the polymers, but rather it is possible for polyesters of relatively low molecular weight and low viscosity to be transformed without lengthening the polyester chain or cross-linking reactions into highly viscous products of high molecular weight, which then constitute for example excellent coating agents. The products obtained by the process according to the present invention can be used as latices, solutions or solid substances. They can be used as coating materials, lacquers, adhesives, components of foam materials and as injection molding compositions, casting resins and cements, for the production of foils, fibres or molded elements. They can be used in the cosmetic field, for example as hair fixatives, or when using hydrophilic polyester or polymer components, as substances capable of being emulsified in normal or reversed manner. Since the products of the process can be further modified by hydrolysis reactions or further reactions with, for example, isocyanates or melamine-methylol compounds, they can be well adapted to special requirements.

The products are especially suitable for reaction with polyisocyanates to prepare polyurethane plastics. They must have free active hydrogen containing groups; and preferably free hydroxyl groups if they are to be satisfactorily used for the preparation of polyurethane plastics. They are particularly advantageous for the preparation of polyurethanes which are resistant to hydrolysis. The polyurethanes may be either porous or nonporous. Suitable processes for preparing porous polyurethane plastics may be found in U.S. Reissue Patent 24,514. Suitable processes for the preparation of nonporous polyurethanes, including coating compositions, may be found in U.S. Patent 2,729,618.

Where cellular polyurethane plastics are prepared, it is preferred to include a catalyst in the reaction mixture, including for example tertiary amines, such as triethylene diamine, N-methyl morpholine, and the like; or organo metallics, such as those disclosed in U.S. Patent 2,846,408, or other organo metallic compounds including stannous octoate, dibutyl tin dilaurate, dibutyl tin dioctoate, dibutyl tin di-2-ethylhexoate or the like. Moreover, it is preferred to use a foam stabilizer substance, such as sulphonated castor oil, polydimethyl siloxane and preferably a polydimethyl siloxane having a viscosity of about 200 centipoises at 25° C., as well as the silicone oil disclosed in U.S. Patent 2,834,748. Moreover, in the preparation of cellular polyurethane plastics it is necessary to have a blowing agent which may be water that reacts with the organic polyisocyanate to yield carbon dioxide or one may use a halohydrocarbon, such as fluorotrichloromethane, dichlorodifluoromethane and the like.

Other organic compounds containing active hydrogen containing groups as determined by the Zerewitinoff method, in addition to the products of the invention may be used in admixture therewith, preferably in amounts up to about 50 percent by weight of the total weight of the polyol. Suitable compounds of this type are hydroxyl polyesters such as are obtained by reacting a polycarboxylic acid and a polyhydric alcohol including for example, adipic acid and ethylene glycol; polyhydric polyalkylene ethers such as are obtained by reacting an alkylene oxide, such as ethylene oxide, propylene oxide or the like, either with itself or with a poylyhdric alcohol such as glycerine, trimethylol propane or the like; or polyhydric polythioethers such as the condensation product of the thiodiglycol and the like. Additional examples of polyhydric polythioethers may be found in U.S. Patent 2,900,368.

The invention is also applicable to the production of coating compositions wherein the organic polyisocyanate and the polyol of the invention are reacted together in any suitable inert solvent which is then used to deposit the coating composition of a substrate. Suitable solvents are benzene, toluene, xylene, ethylene glycol diacetate, carbon tetrachloride and the like.

Any suitable organic polyisocyanate may be used, including aliphatic, cycloaliphatic, alkaryl, aralkyl, heterocyclic and aryl polyisocyanates, such as, for example, diisocyanates, and particularly there may be used tetramethylene diisocyanate, pentamethylene diisocyanate, octamethylene diisocyanate, dodecamethylene diisocyanate, 3,3'-diisocyanato dipropyl ether, xylylene diisocyanates, para, para'-diphenylmethane diisocyanate, beta, beta'-diphenyl propane-4,4'-diisocyanate, and the like. Other examples are meta-phenylene diisocyanate, para-phenylene diisocyanate, 1-methyl phenylene-2,4-diisocyanate, naphthylene-1,4-diisocyanate, naphthylene-1,5-diisocyanate, 2,6-toluylene diisocyanate, 1,3,5-benzene triisocyanate, para, para', -para''-triphenylmethane triisocyanate, and the like. Also, the addition products of polyisocyanates with a deficient quantity of a low molecular weight alcohol, such as, 1,4-butane diol, glycerine, trimethylolpropane, the hexane diols and hexane triols and addition products of the aforementioned polyisocyanates with low molecular weight polyesters, such as castor oil, may also be used. Also suitable are the isocyanate polymers described in German specifications Nos. 1,022,789 and 1,027,394. Mixtures of organic isocyanates may also be employed.

One may also use biuret polyisocyanates of the general formula:

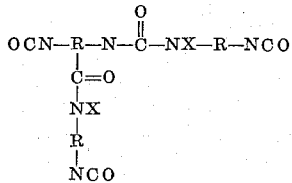

in which R is an aliphatic, hydroaromatic, araliphatic including aralkyl or an aromatic radical, which may or may not be substituted with halogen, such as, chlorine, $NO_2$, an alkyl radical such as methyl, ethyl; an alkoxy radical, methoxy, ethoxy or the like. R should not contain any hydrogen atoms which are reactive with an —NCO group. X is either hydrogen or the grouping

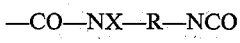

in which X has the same meaning. The polyisocyanates having the biuret structure may be prepared by reacting in a neutral solution water with a monomeric organic diisocyanate in the ratio of 1 mol water to 3 mols diisocyanate or by reacting a monomeric organic diisocyanate with urea diisocyanate of the formula:

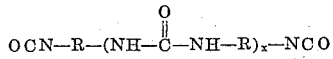

in which R is an aliphatic, hydroaromatic, araliphatic or an aromatic radical, which may or may not be substituted with halogen, such as, chlorine, an $NO_2$ group, an alkyl radical, such as methyl, ethyl; an alkoxy radical, such as methoxy, ethoxy or the like, and $x$ is from 1 to 5.

Any suitable crude isocyanate may be used, such as, for example, crude toluylene diisocyanates obtained by the phosgenation of a mixture of toluylene diamines or crude diphenyl methane isocyanates obtained by the phosgenation of crude diphenyl methane diamine. Crude diphenyl methane diamine is the reaction product of aniline and formaldehyde in the presence of HCl and contains some tri- and higher polyamines. A preferred unrefined or crude isocyanate is one having from about 26 to about 33 percent free —NCO and an amine equivalent of about 120 to about 150, such as, for example, a product having about 32 percent free —NCO and an amine equivalent of about 140. A specific crude isocyanate suitable for use in accordance with the present invention may be obtained by reacting about 60 parts of aniline with about 25 parts of formaldehyde (37 percent aqueous) and about 74 parts of HCl (30 percent aqueous) at a temperature of about 90° C. to about 100° C. for about 1.5 to about 2 hours and then reacting this product with NaOH and separating out the crude amine. About 100 parts of phosgene are then reacted with the crude amine until a product having an amine equivalent of about 135 and containing about 31 precent free —NCO is obtained. The free excess phosgene and substantially all of the solvents used, if any, are then removed. When toluylene diisocyanates, for example, are produced by conventional phosgenation of the corresponding diamines, a product containing about 90 percent 2,4- and 2,6-toluylene diisocyanate and the balance a crude residue of imidazoles and the like resulting in the phosgenation is obtained from the phosgenator. This product may also be used. It is preferred to phosgenate a mixture of ortho- and para-toluylene diamines. A specific product is the undistilled reaction mixture obtained by the phosgenation of 80 percent 2,4- and 20 percent, 2,6-toluylene diamine containing 90 percent of a mixture of about 80 percent 2,4- and 20 percent 2,6-toluylene diisocyanate and the balance polymers incapable of accurate analysis.

The commercially available crude 4,4'-diphenyl methane diisocyanate having an assay of 90 percent maximum, an amine equivalent of 141 maximum, about 0.04 to about 0.4 percent by weight hydrolyzable chloride, about 0.1 to about 0.6 percent by weight total chloride and having a flash point of about 430° F. may be used. As pointed out above, when toluylene diisocyanate, for example is produced by conventional phosgenation of the corresponding diamine, a product containing about 90 percent 2,4- and 2,6-toluylene diisocyanate is obtained from the phosgenator. Of course, the product from the phosgenator is subjected to distillation to remove the solvent so that a product having 90 percent of 2,4- and 2,6-toluylene diisocyanate is obtained. The initial product from the phosgenator in most cases contains about 80 percent by weight of solvent. The 2,4- and 2,6-toluylene diisocyanate may be mixed with any suitable amount of the residue obtained if the isocyanate is refined and then reconstituted. In this event, it is preferred to have at least 50 percent of the refined isocyanate present. The crude polyisocyanates disclosed in U.S. Patent 2,950,307 are suitable.

The polyurethane plastics of the invention are especially suitable for use where polyurethanes having excellent resistance to hydrolysis are required, for example, in the production of foam cushions, gear wheels, pump diaphragms, coatings on wood, metal and the like.

The invention is further illustrated by the following examples in which the parts are by weight unless otherwise indicated.

*Example 1*

About 100 parts of vinyl acetate, about 100 parts of diethylene glycol and about 0.5 part of benzoyl peroxide are homogeneously dissolved in a sealing tube and polymerized for about 24 hours at about 80° C. The polymerized clear composition is thoroughly washed with water in order to remove the diethylene glycol and then dried. A clear thermoplastic composition is obtained as water-insoluble polymer fraction, which does not differ appreciably from a low molecular weight polyvinyl acetate (acid number 0.9; 0.4% OH). In order to determine the possible graft polymer fraction, about 2 parts of the dry polymer are dissolved in ethyl acetate and stirred with about 2 parts of a 30% solution of triphenyl methane triisocyanate in methylene chloride and cast to form a film which is cross-linked for about 2 hours at about 100° C. A subsequent treatment with methanol should only be able to dissolve out from the cross-linked film any homopolymer not carrying OH groups. However, it is found that all the polymer film is dissolved to the point of turbidity in methanol and is thus destroyed.

About 1500 parts of vinyl acetate, about 5 parts of benzoyl peroxide and about 1500 parts of an adipic acid-diethylene glycol polyester having a molecular weight of about 1800 and an OH number of 61.4 and which is weakly branched by the incorporation of about 1 molecule of trimethylol propane per polyester molecule, are polymerized in an autoclave for about 5 hours at about 50° C. and then for about 20 hours at about 80° C. while stirring. The polymer which forms is released while hot and forms an elastic tacky composition on cooling. About 1.82 parts of the composition thus obtained are dissolved in about 2 parts of acetic ester and stirred with about 1 part of the triisocyanate solution employed above and cast to form a film. The film is cross-linked for about 2 hours at about 100° C. A piece of this film is extracted with methanol. The film merely swells and suffers a loss in weight of about 15 percent.

This experiment was repeated using a polymer obtained from about 1500 parts of vinyl acetate, about 3 parts of benzoyl peroxide and about 500 parts of the polyester, and this polymer is likewise of elastic character but has scarcely any tackiness. The cross-linked film shows a loss in weight of about 23 percent on extraction.

It is clear from the extraction tests that the major part of the vinyl acetate used is grafted onto the initially supplied polyester, whereas when diethylene glycol is initially supplied, OH groups of diethylene glycol are not incorporated into the poymerization product, or only to a slight extent, and thus this product exists mainly as a homopolymer.

*Example 2*

About 30 parts of the polyester employed in Example 1 and about 170 parts of vinyl acetate are emulsified in an aqueous phase of the following composition: about 400 parts of water, about 1 part of NaHCO₃, about 6 parts of alkyl sulphonate mixture of mersolate and about 0.5 part of potassium persulphate. Final polymerization then takes place in a nitrogen atmosphere at about 50° C. The latex formed dries as flexible films. A sample of the latex is precipitated, washed and dried. About 2 parts of the dry emulsion polymer are dissolved in acetic ester and stirred with a solution of about 0.5 part of 4,4',4''-triisocyanato triphenyl phosphate of thiophosphuric acid in methylene chloride. A film is cast from the solution and this film is cross-linked at about 100° C. for about 1 hour. The cross-linked polymer film shows a loss in weight of about 18 percent on extraction with methanol, this corresponding to a grafting yield of about 80 percent.

On doubling the quantity of polyester as used above, the loss in weight of the cross-linked polymer film after extraction is only about 8 percent.

*Example 3*

The cross-linking experiment proceeds in the same manner if a linear adipic acid-triethylene glycol polyester having a molecular weight of about 2000 and an OH number of 46, is used in the production of the emulsion polymer. The cross-linked polymer films show a loss in weight of about 21 percent or about 9 percent on extraction.

*Example 4*

A solution of about 15 parts by weight of a linear polyester of adipic acid and ethylene glycol having a molecular weight of about 1900 and an OH number of 42 and about 35 parts of vinyl acetate and about 1.06 parts of azodiisobutyronitrile is polymerized while stirring in an autoclave at about 70° C. A homogeneous tough polymer is formed. About 2 parts of the polymer are stirred with about 1 part of a 30 percent solution of thiophosphoric acid trioxyphenyl-4,4',4''-triisocyanate of Example 2 in methylene chloride and cast to form a film. Cross-linking takes place for about 1 hour at about 100° C. The flexible polymer film which is formed is only initially swelled by acetic ester.

*Example 5*

A solution of about 40 parts of the polyester employed in Example 1, about 60 parts of vinyl chloride and about 0.15 part of benzoyl peroxide is maintained at about 70° C. for about 10 hours in an autoclave. The opaque polymer which forms is soluble in acetic ester and can be cast to form flexible films. About 2 parts of the polymer are dissolved in glycol monomethyl ether acetate, mixed with about 1.5 parts of the triisocyanate solution employed in Example 4 and cast as a film. The film is cross-linked for about 30 minutes at about 100° C. The polymer film is flexible and is not dissolved by glycol monoethyl ether acetate but only swelled.

*Example 6*

About 60 parts of vinyl acetate, about 1 part of benzoyl peroxide and about 40 parts of a polyester having a molecular weight of about 1300 and which had been obtained from azelaic acid and triethylene glycol having an OH number of 69, are maintained at about 85° C. for about 30 hours in a sealing tube. About 2 parts of the tough polymer thus obtained are dissolved together with about 2 parts of the triisocyanate solution employed in Example 4 in methylene chloride and cast as a film. The film is cross-linked for about 30 minutes at 100° C. The slightly colored flexible film thus obtained is only initially swelled by acetic ester.

*Example 7*

The procedure of Example 6 is repeated except that a polyester having a molecular weight of about 1500 is employed. The polyester was prepared from adipic acid and an equimolar mixture of hexanediol and diethylene glycol and has an OH number of 58. After treatment with the triisocyanate, the polymer film is likewise only initially swellable in solvents.

*Example 8*

About 50 parts of vinyl acetate, about 50 parts of vinyl chloride, about 50 parts of the polyester employed in Example 1 and about 0.1 part of benzoyl peroxide, are first of all stirred for about 5 hours at about 60° C., in an autoclave under nitrogen, and then, after adding another about 0.5 part of benzoyl peroxide, stirred for about 10 hours at about 80° C. About 2 parts of the slightly tacky, film-forming polymer thus obtained are dissolved in methylene chloride and, after adding about 1.2 parts of the isocyanate solution employed in Example 4, cast as a film. The film is then cross-linked. Thereafter, the film is only slightly swelled by acetic ester.

It is to be understood that the foregoing examples are given for the purpose of illustration and since this is the case, any other suitable polyester, ethylenically unsaturated monomer, catalyst for the reaction and organic polyisocyanate, solvent or the like, could have been used provided that the teachings of this disclosure are followed.

Although the invention has been described in considerable detail in the foregoing, it is to be understood that such detail is solely for the purpose of illustration and that many variations can be made by those skilled in the art without departing from the spirit and scope of the invention except as set forth in the claims.

What is claimed is:

1. Graft polymers prepared by a process which comprises polymerizing in the presence of a free radical forming catalyst a vinyl monomer having only one vinyl group selected from the group consisting of vinyl acetate and vinyl chloride with a saturated polyester having the formula

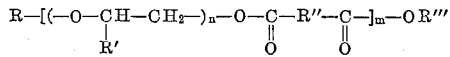

wherein R is a member selected from the group consisting of hydrogen, a polyester radical, a monocarboxylic acid radical and a dicarboxylic acid radical, R' is a member selected from the group consisting of hydrogen and a lower alkyl radical, R" is an aliphatic hydrocarbon radical having from 4 to 14 carbon atoms, R''' is selected from the group consisting of a hydrogen atom and alkoxy, $n$ is 1 to 3, and $m$ is at least 2 and the saturated polyester of the above formula has a molecular weight of about 900 to about 9000.

2. The graft polymer of claim 1 wherein said vinyl monomer is polymerized with said saturated polyester in the presence of a peroxide catalyst.

3. The graft polymer of claim 1 wherein said saturated polyester is an adipic acid-diethylene glycol polyester having a molecular weight of about 1800.

4. The graft polymer of claim 1 wherein from about 1 to about 99 percent by weight of the polymer is made up of the vinyl monomer.

5. The polyurethane plastic prepared by a process which comprises reacting an organic polyisocyanate with graft polymers prepared by a process which comprises polymerizing in the presence of a free radical forming catalyst a vinyl monomer having only one vinyl group selected from the group consisting of vinyl acetate and vinyl chloride with a saturated polyester having the formula

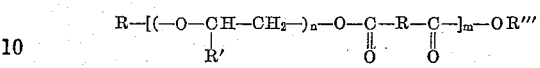

wherein R is a member selected from the group consisting of hydrogen, a polyester radical, a monocarboxylic acid radical and a dicarboxylic acid radical, R' is a member selected from the group consisting of hydrogen and a lower alkyl radical, R" is an aliphatic hydrocarbon radical having from 4 to 12 carbon atoms, R''' is selected from the group consisting of a hydrogen atom and alkoxy, $n$ is 1 to 3, and $m$ is at least 2 and the saturated polyester of the above formula has a molecular weight of about 900 to about 9000, with the proviso that the saturated polyester has a plurality of free hydroxyl groups.

6. The polyurethane plastic of claim 5 wherein said reaction mixture includes a blowing agent to prepare a cellular polyurethane plastic.

7. The polyurethane plastic of claim 5 wherein said saturated polyester is prepared by a process which comprises condensing adipic acid with diethylene glycol.

8. The polymer of claim 1 wherein said saturated polyester is an adipic acid-diethylene glycol polyester.

References Cited by the Examiner

UNITED STATES PATENTS

| | | | |
|---|---|---|---|
| 2,740,743 | 4/1958 | Pace | 260—859 |
| 3,024,207 | 3/1962 | Shaw et al. | 260—873 |
| 3,033,841 | 5/1962 | Germain | 260—89.1 |
| 3,130,175 | 4/1964 | Peter et al. | 260—859 |
| 3,222,421 | 12/1965 | Lundberg | 260—885 |

FOREIGN PATENTS

| | | |
|---|---|---|
| 490,543 | 8/1938 | Great Britain. |
| 679,562 | 9/1952 | Great Britain. |
| 876,001 | 8/1961 | Great Britain. |

MURRAY TILLMAN, *Primary Examiner.*

SAMUEL H. BLECH, *Examiner.*

J. T. GOOLKASIAN, *Assistant Examiner.*